(12) United States Patent
Weatherall et al.

(10) Patent No.: US 7,291,297 B2
(45) Date of Patent: Nov. 6, 2007

(54) INJECTION MOLDING METHOD AND APPARATUS FOR CONTINUOUS PLASTICATION

(75) Inventors: Douglas James Weatherall, Bolton (CA); Alexandre Edouard Raoul Paris, Utopia (CA)

(73) Assignee: Husky Injection Molding Systems Ltd. (CA)

( * ) Notice: Subject to any disclaimer, the term of this patent is extended or adjusted under 35 U.S.C. 154(b) by 664 days.

(21) Appl. No.: 10/762,329

(22) Filed: Jan. 23, 2004

(65) Prior Publication Data
US 2005/0161847 A1   Jul. 28, 2005

(51) Int. Cl.
*B29C 45/52* (2006.01)
*B29C 45/77* (2006.01)

(52) U.S. Cl. .............................. 264/40.1; 264/328.17; 425/145; 425/587

(58) Field of Classification Search ............. 264/328.1, 264/40.1, 328.17; 425/145, 582, 583, 587
See application file for complete search history.

(56) References Cited

U.S. PATENT DOCUMENTS

| | | | | |
|---|---|---|---|---|
| 2,629,132 A | | 2/1953 | Willcox ...................... 425/578 |
| 2,734,226 A | | 2/1956 | Willert ........................ 425/550 |
| 2,885,734 A | | 5/1959 | Wucher ...................... 425/550 |
| 3,002,229 A | | 10/1961 | Friederich ............... 264/328.17 |
| 3,020,591 A | | 2/1962 | Breher ........................ 425/550 |
| 3,263,276 A | * | 8/1966 | Maier .......................... 425/208 |
| 3,281,899 A | * | 11/1966 | Dacco ........................ 222/142 |
| 3,728,053 A | * | 4/1973 | Stillhard et al. ............ 425/4 R |
| 3,804,381 A | * | 4/1974 | Bielfeldt et al. ........... 366/76.9 |
| 4,256,678 A | * | 3/1981 | Fujita et al. ............... 264/40.1 |
| 4,722,679 A | | 2/1988 | Farrell ........................ 425/562 |
| 5,013,231 A | * | 5/1991 | Fujita et al. ................ 425/145 |
| 5,112,213 A | | 5/1992 | Oas ............................ 425/146 |
| 6,059,556 A | * | 5/2000 | Koike et al. ................ 425/145 |
| 6,284,170 B1 | * | 9/2001 | Hiraoka ..................... 264/40.1 |
| 6,615,637 B2 | | 9/2003 | Katsuta et al. |
| 7,074,028 B2 | * | 7/2006 | Watanabe et al. .......... 425/145 |
| 2003/0034577 A1 | * | 2/2003 | Seta et al. ................. 264/40.3 |

OTHER PUBLICATIONS

Spirex Corporation website (www.SPIREX.com)—Product Description for an F-LOC Non Return Valve, 2002.
Knights, Mikell, "Know How: Injection Molded Furniture in a Slump," Plastics Technology Online Article, www.plasticstechnology.com/articles/200302bib3.html, Feb. 2002.

* cited by examiner

Primary Examiner—Jill L. Heitbrink
(74) Attorney, Agent, or Firm—Katten Muchin Rosenman LLP

(57) ABSTRACT

In a reciprocating (RS) injection unit environment, as shown in FIG. 1, a controller of the injection unit is arranged to continuously rotate the screw during both conventional plasticizing operation and shot injection. In this way the RS unit is more efficient, utilizing less energy and producing greater resin output. The injection unit includes a non-return valve adjacent a nozzle, which non-return valve is either configured to rotate with the screw to reduce wear or presented as a ball check style noon-return valve. In an injection molding environment, the rotating screw includes flights that allow granules of resin to melt and mix in spaces between adjacent flights, but the flights are arranged substantially to inhibit excessive displacement of resin around the flights.

23 Claims, 10 Drawing Sheets

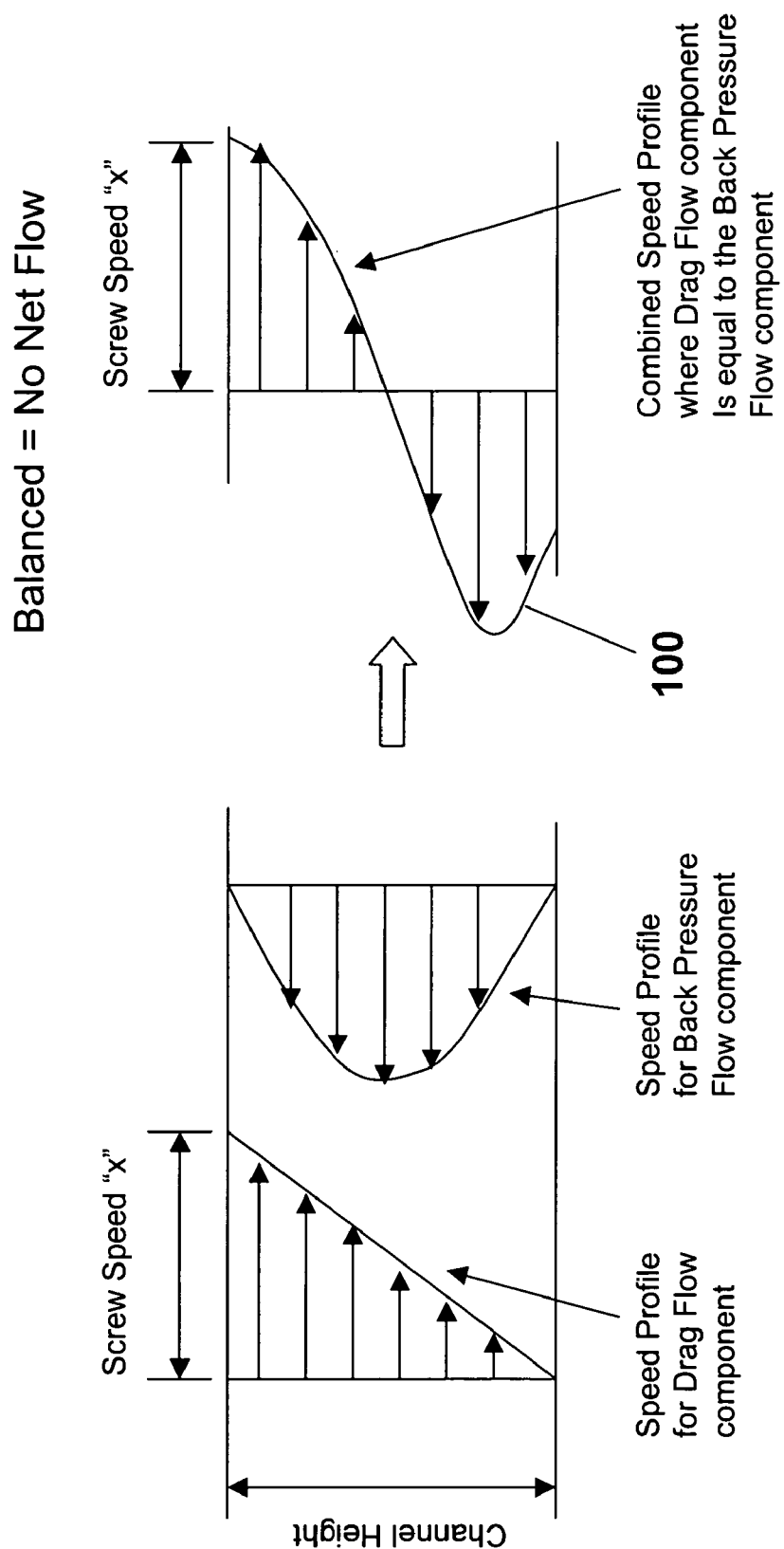

INJECTION MOLDING METHOD AND APPARATUS FOR CONTINUOUS PLASTICATION

BACKGROUND OF THE INVENTION

1. Field of the Invention

The present invention relates to a reciprocating screw (RS) injection unit and is particularly, but not exclusively, applicable to a method of operating such an RS injection unit in a plastic injection molding machine.

2. Related Art

In a conventional RS unit, a feedscrew is rotated intermittently, thereby limiting the amount of time available for plasticizing the next injection shot. The waiting time between driving operations is usually called the recovery time.

During the injection phase of operation of a conventional RS injection unit, the non-rotating screw is advanced to inject the melt into the mold. As the flights of the screw pass under the open hopper feed throat, unmelted resin granules fall in between the flights, becoming available for plasticating when the screw resumes rotation. However, in some applications, such as those with high speed injection rates, the high speed translation of the screw relative to the hopper feed throat does not allow for a complete filling of the spaces defined between the flights. Therefore only partial filling of the RS screw is achieved.

FIG. 4 shows a sequence of operation chart for a typical conventional (non-continuous) recovery cycle for an RS type injection unit. The process begins when a shut off valve opens ("S/O" means "shut off" and refers to the valve in the nozzle that controls the resin flow into the mold). Melt is then injected into the mold. The pressure on the melt in the mold is maintained for a period, after which pre-pullback begins. Upon completion of pre-pullback the shut off valve closes. As screw recovery begins, the screw speed sharply increases and plateaus during screw recovery. The screw speed subsequently decreases and stops whereafter post-pullback begins. As the injection unit goes through these cycle steps, the clamp unit holds the mold closed during injection, hold and cooling of the part, and then opens the mold to eject the part. After this the mold is closed again, ready to repeat the cycle.

Injection molding RS units are well known in the art. For example, U.S. Pat. No. 2,629,132 to Willcox discloses an early RS injection unit, wherein a motor turns the screw to cause plastic pellets beneath the hopper to be conveyed towards a bore where melted plastic accumulates. The screw is then translated by a piston to push the melted plastic from the bore into the mold via the nozzle. The feedscrew's shank (to the right of the flights) seals in the bore, thereby blocking off the hopper inlet. The feedscrew is then retracted by the piston and is rotated during the retraction by the motor to cause plasticizing.

Two practical deficiencies arise from this disclosure. First, during the translation of the screw to inject the material into the mold, the leading end of the screw makes no seal with the inside surface of the bore until it has reached the end of its stroke when it seals with a bushing. Therefore, some of the melted plastic in the bore is able to flow backwards across the flights of the screw as it moves to the left during injection. This loss of plastic makes controlling the shot size unpredictable from cycle to cycle. Second, as the screw begins to be retracted and rotated, the hopper inlet continues to be blocked by the screw shank, so no new material can enter the screw flights. Indeed, the hopper inlet does not become unsealed until the screw is fully retracted (to the right). In fact, the retraction of the screw with the hopper inlet sealed will cause air to be drawn into the bore via the nozzle and gate opening (in the mold) after the most recent molded part has been removed. This ingested air must then be displaced by the next shot of plastic as it is prepared in the bore by the feeding action of the screw when rotating in its fully retracted position. This may result in the formation of bubbles of air in the next molded part unless this air is vented prior to the next injection stroke of the screw.

U.S. Pat. No. 2,734,226 to Willert discloses an RS injection unit that includes a shut off nozzle that allows melt to be accumulated between the screw tip and the barrel head, and a back pressure generated by restricting the venting of the oil from the injection pressure as the screw is pushed rearwards by the accumulating melted plastic in front of it. The patent also discloses continuous rotation of feed screw. Again, the leading end of the screw makes no seal with inside surface of the barrel bore, thereby allowing some melted resin to flow backwards as the screw is translated during its injection stroke. Not only is shot control affected, but also only moderate injection pressures can be achieved due to the absence of a sealing feature. Furthermore, because the screw does not pause at the end of recovery (plasticating), the injection stroke of the screw starts immediately, and control of the shot size is poor.

U.S. Pat. No. 2,885,734 to Wucher discloses an injection unit that has a non-return valve disc attached to a diffuser head or screw tip that acts as a valve during the injection stroke, thereby inhibiting back flow of the material. This is an early example of a screw mounted non-return valve.

U.S. Pat. No. 3,002,229 to Friedrich discloses a die casting machine. A spring loaded shut off nozzle contains the melted material prior to injection. The screw does not translate but instead accumulates the melted material along the screw flights and in the space ahead of the screw where it is compressed while the shut off nozzle is closed. The patent discloses turning the screw continuously at two different speeds. A slow first speed is used for feeding and melting the material, and a higher second speed is used for injecting the material into the mold when the nozzle shut off is opened. Because the screw does not translate only a small shot size is prepared, and a relatively moderate injection pressure is generated since a non-return valve on the screw is absent.

U.S. Pat. No. 3,020,591 to Breher discloses an injection molding machine having a screw having a non-return valve and an accumulating chamber downstream of the screw. The patent also teaches that the feeder worm (screw) works uninterruptedly as it melts the plastic and feeds into the accumulating chamber. Injection of the melt is done by activating cylinders to cause the barrel head assembly to act like a piston inside the accumulating cylinder and displace its contents via the nozzle into the mold. A ball check non-return valve prevents backflow into the extruder cylinder.

U.S. Pat. No. 4,722,679 to Farrell discloses an injection unit that includes an RS extruder supplemented by two piston cylinder arrangements, one for accumulating the melt and filling the mold and the second for providing packing and suck back operations. The screw is fitted with a check ring (non return valve). The design provides a means to increase the shot size capacity of the unit without having to increase the size of the screw. The patent discloses that the screw recovery operation can begin as soon as the mold filling operation has been completed.

U.S. Pat. No. 5,112,213 to Oas discloses an RS injection unit with a check ring style non-return valve designed so that by rotating the screw briefly in the opposite direction prior to injection causes the check ring to seal against the tapered seat thereby reducing the possibility of leakage.

The Spirex website provides an example of a check ring style non-return valve .(F-LOC) that features an interlocking ring which turns with the retainer and plasticating screw as it rotates. Because the ring is not rotating against the front seat of the retainer, adhesive wear problems in this area are eliminated.

The *Plastics Technology* online article "Know-How: Injection Molded Furniture in a Slump" explains the intrusion process, sometimes called flow molding, whereby an injection unit of limited plasticizing capacity can be used for molding parts requiring larger shot sizes than the unit is able to supply conventionally. The article discloses a known process in which the mold is partly filled by turning the screw to pump plastic under low pressure into the mold. Specifically, the screw rotates without moving forward with the screw used as an extruder prior to its use in injection as a ram. The injection function carries out the final filling and packing steps.

SUMMARY OF THE INVENTION

An advantage of the present invention is the increased output efficiency and decreased energy demand of RS injection units operated in accordance with the apparatus and methods described herein. The present invention features structure and/or steps whereby the screw rotation time is increased substantially, thereby improving the injection molding machine's output efficiency.

According to a first aspect of the present invention, structure and/or steps are provided for a reciprocating screw injection unit having a cyclic operating period. The unit includes an axially translating screw mounted within a barrel, the screw having associated therewith a non-return valve downstream of which a volume of melt can, in use, be accumulated. The unit also includes a first actuator arranged to effect axial movement of the screw relative to the barrel and to generate, in use, back-pressure. A second actuator is coupled to the screw to control, in use, the rotational speed of the screw. The unit further includes a controller for controlling operation of the screw and the first actuator, the controller arranged to set an axial position for the screw that defines the volume of melt to be accumulated downstream of the non-return valve by effecting, in use, an increase in the back-pressure to prohibit any further increase in the volume for melt accumulation and to render a recovery rate for the screw of substantially zero, and wherein the controller is arranged to ensure that the screw, during use, rotates substantially continuously over the entire cyclic operating period.

According to a second aspect of the present invention, structure and/or steps are provided for a reciprocating screw injection unit developing injection pressures for injection purposes. The reciprocating screw injection unit includes a screw within a barrel having a shot chamber into which molten material is accumulated, the injection unit having an adjustable recovery rate. The reciprocating screw injection unit includes means for dynamically varying revolutions per minute of the screw within the barrel, means for adjusting back-pressure developed by the injection unit to control location and axial movement of the screw relative to the barrel, and means for controlling the recovery rate during screw recovery and injection phases. The means for controlling operational affects the means for dynamically varying and the means for adjusting back-pressure. During plasticizing, the rotational speed of the screw is above zero for a substantial period of the entire operating cycle.

According to a third aspect of the present invention, structure and/or steps are provided for a controller of an injection molding machine. The controller is arranged, in use, to control axial positioning of a reciprocating and continuously rotating feedscrew through selective control of back-pressure, the controller further arranged to support and control the development, in use within the injection molding machine, of back-pressure for material injection directly into one of a mold and a runner system.

According to a fourth aspect of the present invention, a method is provided for operating a reciprocating feed screw of an injection unit having a non-return valve associated therewith, the non-return valve permitting the injection unit to operate at injection pressures. The method includes the steps of rotating the reciprocating screw at a speed above zero revolutions per minute for substantially the entire injection molding cycle.

According to a fifth aspect of the present invention, structure and/or steps are provided for a computer program element including computer program code means to make the computer execute procedure. The procedure includes rotating a reciprocating screw of an injection unit at a speed above zero revolutions per minute for substantially an entire injection molding cycle, and preferably at least 60% of the injection cycle.

According to a sixth aspect of the present invention, structure and/or steps are provided for an injection molding machine having an injection unit base. The base includes a barrel with an axially translating and reciprocating screw therein, the barrel having a nozzle to support, in use, injection of melt into one of a runner system and a mold, the screw having associated therewith a non-return valve downstream of which a volume of melt can, in use, be accumulated. Also included are a first actuator arranged to effect axial movement of the screw relative to the barrel and to generate, in use, back-pressure, and a second actuator coupled to the screw to control, in use, rotational speed of the screw, and a controller for controlling operation of the screw and the first actuator. The controller is arranged to set an axial position for the screw that defines the volume of melt to be accumulated downstream of the non-return valve by effecting, in use, an increase in the back-pressure to prohibit any further increase in the volume for melt accumulation and to render a recovery rate for the screw as being substantially zero. The controller is arranged to ensure that the screw, during use, rotates substantially continuously. In an embodiment of the invention, the first actuator is a hydraulic cylinder and the second actuator is an electric motor. Alternatively, the first actuator is an electric motor, or an electro mechanical device, for example an electric motor with a rack and pinion arrangement to translate the screw. Alternatively, the second actuator is a hydraulic motor.

BRIEF DESCRIPTION OF THE DRAWINGS

Exemplary embodiments of the present invention will now be described with reference to the accompanying drawings in which:

FIG. 10 is a chart showing the net flow profile of the melt in barrel when the drag flow component is equal to the back pressure flow component.

DETAILED DESCRIPTION OF THE PRESENTLY PREFERRED EXEMPLARY EMBODIMENTS

1. Introduction

As discussed above, there is a need in the art for an RS injection unit apparatus and method that obviates a number of the problems noted above, and provides increased efficiency. There is further a need in the art for an injection unit apparatus and method that utilizes a screw with a non-return valve to inject and maintain hold pressure in a mold cavity, while the screw continues to rotate in a direction for plasticating resin without displacing resin for the next shot into a reservoir downstream of the screw. There is further a need for apparatus and methods for melting and mixing the resin between the flights of an injection screw without displacing that resin along said flights toward an open outlet at the screw tip. These needs are addressed by the apparatus and methods of the present invention described herein.

The concepts of the present invention will now be described with respect to an exemplary application in a plastic injection molding machine in which the efficiency and output of an RS injection unit are improved by the continuous rotation of a translating feed screw equipped with a non-return valve or seal. Preferably, the rotating screw features flights that allow resin to melt and mix in the spaces between the flights, but do not permit excessive displacement of resin around the flights.

2. The Structure

Figure 1:
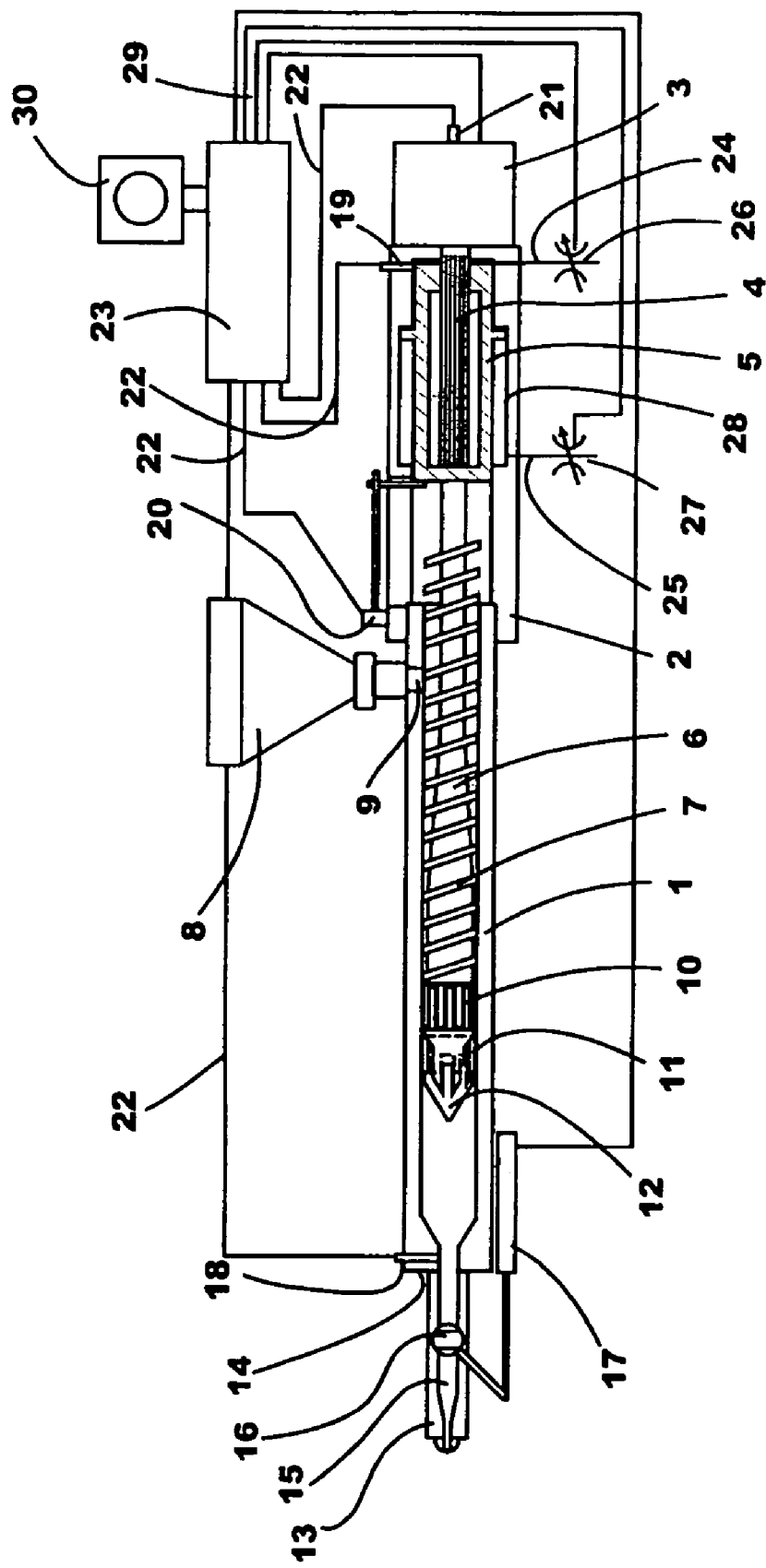
FIG. 1 is a side view of an RS injection unit at the end of the recovery stroke, the RS injection unit being capable of supporting the concepts of the present invention.
Figure 2:
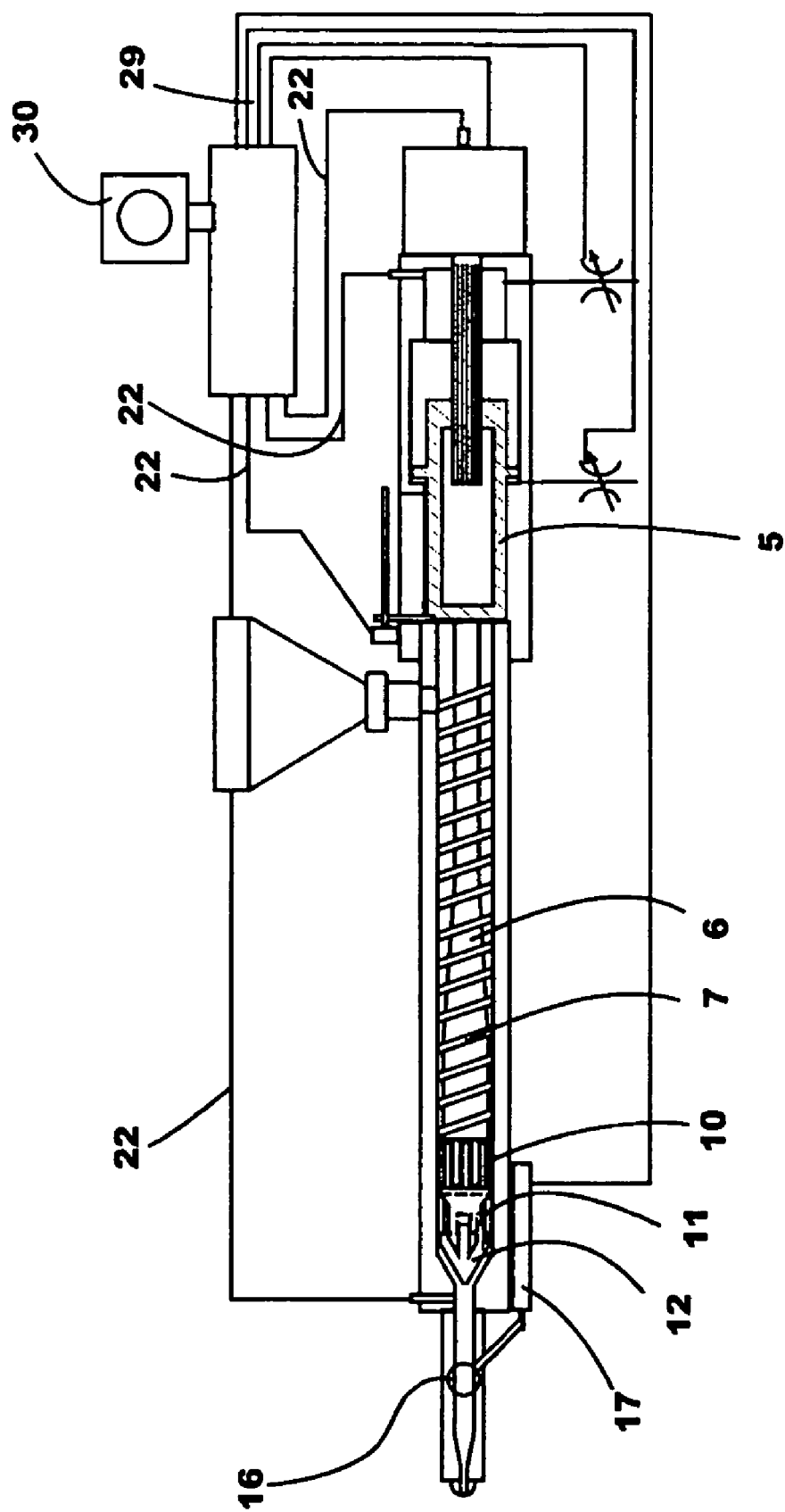
FIG. 2 is a side view of an RS injection unit at the end of the injection stroke, the RS injection unit being capable of supporting the concepts of the present invention.
Figure 3:
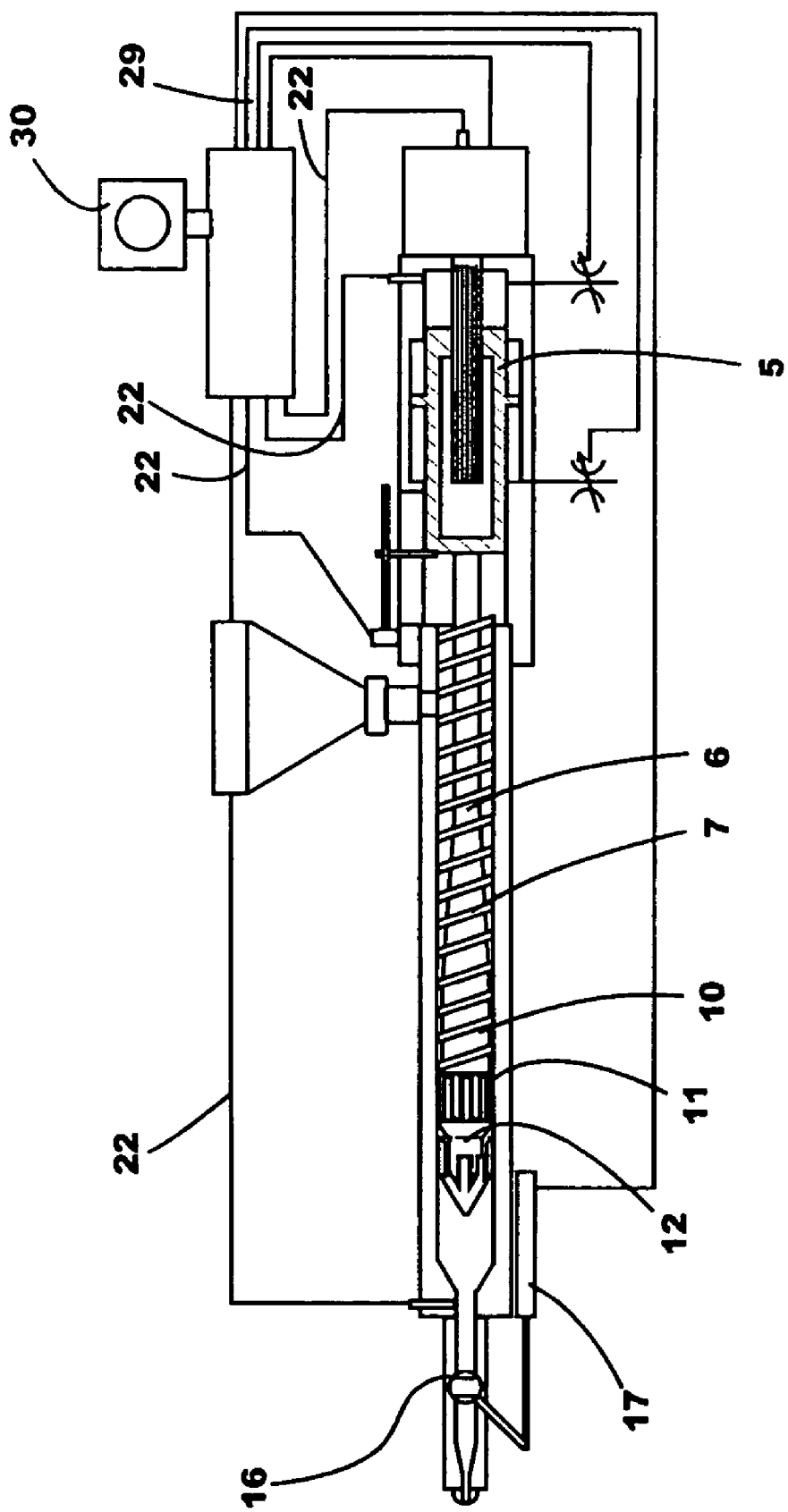
FIG. 3 is a side view of an RS injection unit during the recovery stroke, the RS injection unit being capable of supporting the concepts of the present invention.

FIGS. 1-3 show a reciprocating screw injection unit of a plastic injection molding machine comprising a barrel 1 mounted in a housing 2. A screw drive motor 3 is attached to one end of the housing 2, its splined drive shaft 4 extending inside the housing 2. A hollow injection piston 5 engages the splines of the drive shaft 4 and slides within an injection cylinder 28 of the housing 2. A feedscrew 6 within the barrel 1 is attached at one end to the end of the injection piston 5 such that when the piston rotates and translates (i.e., longitudinally moves) inside the housing it also rotates and translates the feedscrew 6. The feedscrew 6 has flights 7 to convey plastic material that enters the barrel from the hopper 8 via feed throat 9 as the feedscrew 6 is turned by the motor 3. The feedscrew 6 also has a mixer 10 and non-return valve 11 at its tip end 12. A nozzle 13 is connected to the barrel head 14, and contains a melt channel 15 to convey the melted plastic from the barrel to the mold (not shown). A shut off valve 16 is provided in the nozzle 13 selectively to block or unblock the melt channel 15. The shut-off valve 16 is moved by cylinder 17.

For a laboratory machine application, a plastic pressure sensor 18 is optionally provided in the barrel head to measure plastic pressure downstream of the screw tip 12 and upstream of the shut off valve 16. For a production machine application, a hydraulic pressure sensor 19 may be provided in the housing 2 to measure the pressure of the hydraulic oil on the motor side of the injection piston 5. A screw position transducer 20 or the like, typically a Temposonic style, is preferably mounted on the housing 2 to measure the position of the feedscrew 6 longitudinally with respect to the barrel 1. Since the feedscrew 6 is connected to the end of the injection piston 5, the position sensor 20 also measures the position of the injection piston with respect to the housing. A feedscrew speed sensor 21 is preferably mounted on the motor 3 to measure the rotary speed of the motor shaft 4, and since the injection piston 5 is splined to this shaft and the feedscrew 6 is connected to the end of the injection piston 5, the speed sensor 21 effectively measures the rotary speed of the feedscrew 6. Signals from all the aforementioned sensors are conveyed via suitable connections 22 to the controller 23, such as a microprocessor based, programmable controller that could be part of a conventional computer linked to any suitable peripheral, including, for example, a data input device 30 (e.g. a CD ROM drive or the like).

The controller 23 is preferably part of the injection molding machine's controller which is preferably a PC based unit well known in the art.

Pressurized hydraulic oil is supplied to or vented from the injection cylinder 28 via line 24. As shown in FIG. 2, oil supplied via line 24 advances the injection piston 5 and screw 6 to inject the plastic downstream of the screw tip 12 into the mold. Oil vented via line 24 allows the injection piston 5 and screw 6 to retract during recovery. Line 24 is also typically provided with a servo controlled valve 26 to meter out the vented oil thereby controlling the back pressure resisting the retraction of the injection piston 5. Increasing the back pressure decreases the recovery rate, increasing the number of screw revolutions required per unit of axial displacement. This has the effect of increasing the shear heating of the plastic as the screw retracts. Pressurized hydraulic oil is supplied to or vented from the injection cylinder 28 via line 25. Oil supplied via line 25 retracts the injection piston 5 and screw 6 to provide "suckback" (pullback) at the nozzle. Line 25 is also provided with a servo controlled valve 27 to meter out the vented oil thereby controlling the pressure resisting the advancing of the piston 5 and screw 6 during the injection stroke. This allows a profiled or variable injection stroke, or injection rate, to be provided. The controller 23 is connected via any suitable communication means 29 to the servo valves 26, 27, motor speed control 21, and shut off cylinder actuator 17 to communicate command signals for selective control of their respective operation.

One of the issues encountered when continuously turning the screw while using the screw as an injection piston is the risk of increasing the wear rate of the non return valve. This is a particular concern if the non return valve is a check ring type comprising a tubular sleeve surrounding the screw tip having a tapered sealing surface engaging a corresponding tapered surface at the screw tip. Such a design prevents backflow of the melt when the screw is advanced for the injection and packing (hold) functions. The outer surface of the check ring sleeve slides within the barrel bore and provides a partial sealing function to inhibit the backflow of melt between the bore and check ring outer surface during injection and packing functions.

Depending on the degree of clearance between the check ring outer surface and the barrel bore, the ring may resist rotation, only sliding along the barrel as the screw reciprocates instead of rotating with it as it turns. Consequently, in the past when the screw was advanced for the injection function, causing the check ring's tapered sealing surface to engage that of the screw, the rotating screw and non-rotating check ring seal would rub against each other until the ring rotated at the same speed as the screw. This rubbing action accelerated the wear rate of the tapered sealing surfaces.

In a preferred embodiment of the present invention, an interlocking or "castled" style check ring is used, preferably a Spirex F-LOC type check ring, that rotates with the screw, thereby eliminating or minimizing this wear problem. Alternately, according to another embodiment of the invention, a ball check style of non-return valve can be used.

3. The Method

Figure 8:
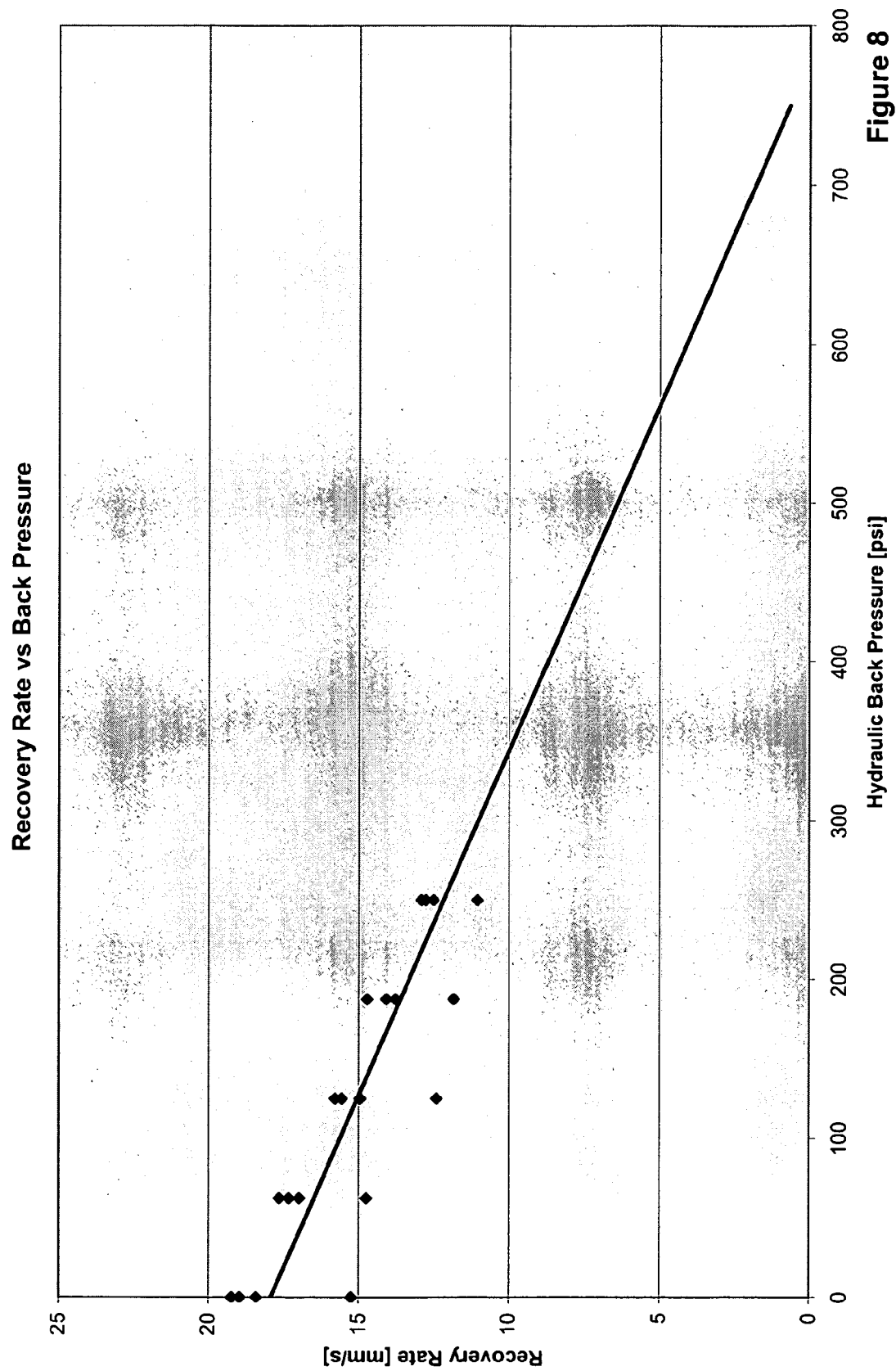
FIG. 8 is a chart showing screw translation rate versus back pressure typical for both conventional and Continuous Recovery applications.

In operation, the screw position and hydraulic oil pressure are sensed. When the desired shot size is reached, servo valve 26 is closed to stop translational movement of the screw, resulting in a pressure increase in the cylinder bore and preventing the screw 6 from moving back. Alternatively, a hydraulic pressure could be applied to the bore side of the cylinder to prevent the screw from moving back as it continues to rotate. FIG. 8 illustrates the typical relationship between back pressure (measured in psi) and the rate of translation (measured in mm/second) of the screw during recovery. It can be seen by extending the line to intersect with the X axis that a modest back pressure of about 750 psi is all that is required to stop the screw from translating in this example. This illustrates that relatively low hydraulic pressures can be employed to control screw translation. The pressure of the resin downstream of the screw tip 12 increases in direct proportion to the pressure exerted on the piston by the hydraulic oil. If the pressure exceeds that developed by the screw, this pressure causes the non-return valve 11 to close, hence stopping any backflow of the melt through the non-return valve.

When the mold is ready to receive the next shot, the shut off nozzle 16 is opened (see FIG. 2) and the hydraulic pressure is raised to the required injection pressure (about 2000 psi) to translate the screw 6, at the desired speed (for example 750 mm/s). The non return valve 11 remains closed, and the melt is injected into the mold (not shown). Throughout this procedure the screw 6 continues to turn. During the screw dwell time (of about 0.5 seconds), the resin upstream of the closed non-return valve 11 continues to be melted and mixed, but is not necessarily conveyed forward with respect to the screw flights.

At the end of the injection stroke of the screw, forward pressure (of about 1200 psi) is maintained to pack the resin in the mold, usually until the gate has frozen or has been closed mechanically. A brief retraction of the screw to "suck back" (pullback) or decompress the runner system may follow. The screw continues turning, possibly at a lower rate, throughout this activity. As shown in FIG. 3, the shut off nozzle 16 is closed and recovery of the screw and the preparation of the next shot commences as the screw 6 continues turning.

The injection rate, or speed of forward motion of the screw 6, is preferably controlled by the metering in of hydraulic oil supplied to the injection piston as it advances in its cylinder, or, as in the case of Thixomolding, by metering out of the hydraulic oil behind the injection piston, as it moves. These hydraulic "metering" activities are performed by servo valves 26 and 27 controlled by the controller 23 in response to the "real time" position of the screw as sensed by the screw position sensor 20. Thus a closed loop control of the injection rate of the screw is achieved. Similarly, the recovery of the screw is preferably controlled by adjusting the screw speed and "metering out" the hydraulic oil providing back pressure behind the injection piston. The servo valve 26 controlling this function is controlled by the controller 23 in response to screw position as sensed by the screw position sensor 20 and the rotational speed of the screw, measured by sensor 21 and as determined by the software control program. Thus a closed loop control of the recovery rate of the screw is achieved.

Plastic granules are therefore continuously added into the rotating screw, with these granules subjected to heating through shear forces and ancillary heater bands generally positioned along the barrel. Homogeneity of the melt is further improved by continuous screw rotation. Substantially no resin is displaced into said downstream reservoir by the feed screw flights as the feed screw rotates.

The present invention can also be understood by considering the following description of the flow profiles between the inside of the barrel and the screw.

Figure 9:
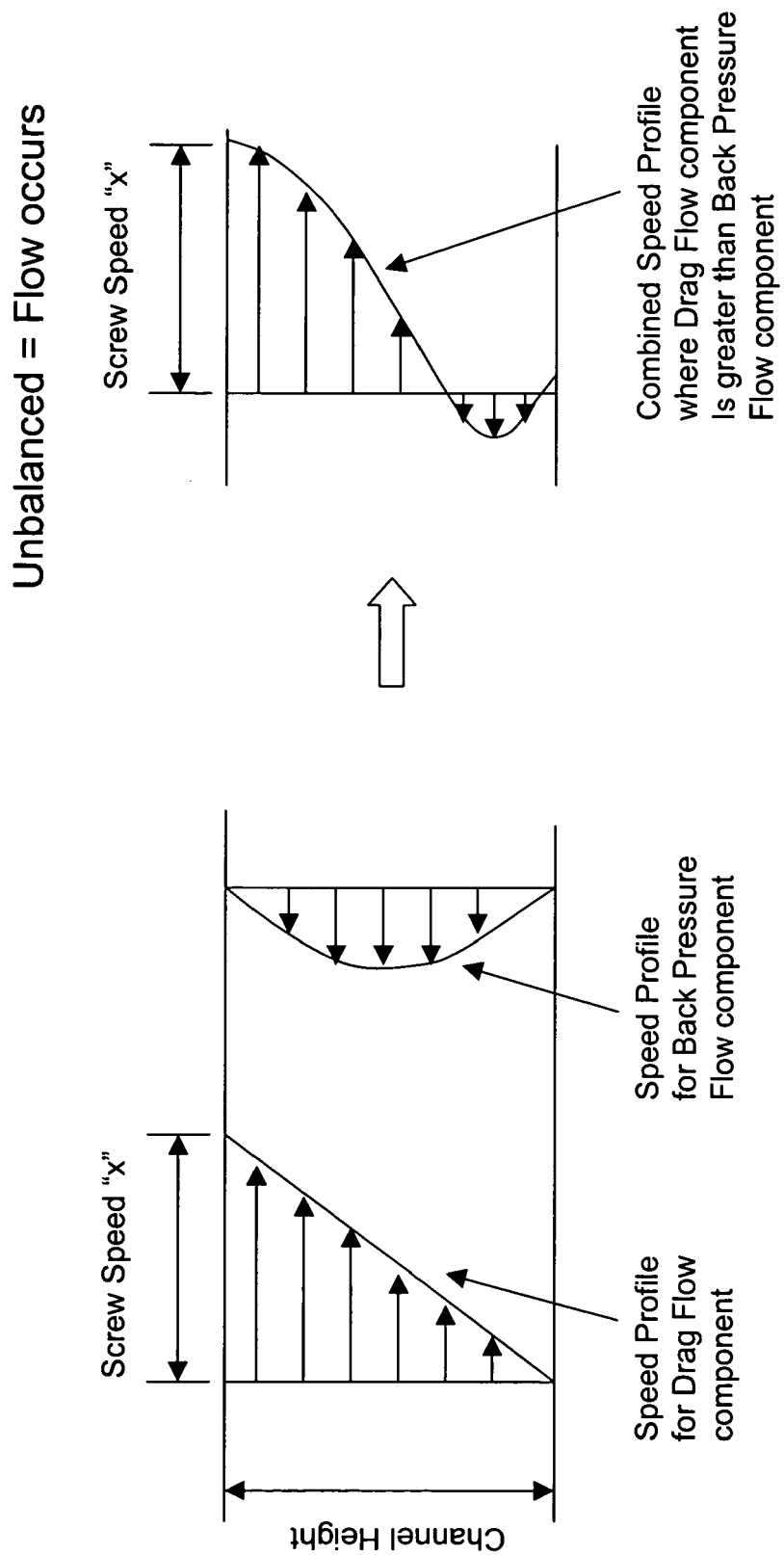
FIG. 9 is a chart showing the net flow profile of the melt in barrel when the drag flow component is greater than the back pressure flow component.

To better appreciate how, in the context of the present invention, the so-called "drag flow" and "back-pressure" are inter-related and how, from a velocity or speed perspective, their respective speed profiles both combine and are a function of the pressure, reference will be made to FIGS. 9 and 10. FIG. 9 exemplifies the usual flow profile within the barrel of an RS screw during a plasticizing operation (typically midway through screw recovery). FIG. 10 shows a balanced flow position where there is no substantial net displacement, movement, or exchange, and, ideally, no net displacement, movement or exchange of plastic material between the molten material that is accumulated in a chamber created in front of the check valve 11 (i.e. in the space in front of tip end 12, as shown in FIG. 1).

Also, it is necessary to recall that the "recovery rate" of the system is, in fact, the plasticizing rate, i.e. the output of the screw per unit time. Usually, recovery rate is measured in units of grams per second or the like.

Referring briefly to FIG. 9, it can be seen and appreciated that, across the channel height (i.e. essentially the depth of the flight of the screw), the drag flow profile (i.e. the speed profile) is essentially triangular in nature. The drag flow speed profile causes melt to be forcibly conveyed downstream towards the nozzle. Hence, melt may accumulate in front of the tip end 12 of the axially reciprocating screw. It will be further appreciated that the pitch of the flights of the screw is responsible for generating the drag flow. Of course, to prevent wear of both the flights and the interior of the barrel, the flights generally have a diameter nominally slightly less than that of the barrel's interior diameter, although the overall screw diameter (as measured from the extremities of the fights) may vary along the length of the screw to provide specific processing, e.g., enhanced mixing functions. As to the back-pressure profile, caused by the hydraulic pressure developed in the cylinders of the screw, this has a speed profile that is generally symmetrical but parabolic in nature, with zero velocity at the edges of the channel (height).

A summation of the drag and back-pressure speed profiles results in an asymmetric parabolic function (across the channel height) that causes mixing, but which profile has a predominant (molten) material flow forward through the check valve 11. Molten material is therefore collected in the accumulation volume or chamber defined between the nozzle shut off valve 16 and the axially translating tip end 12 of the screw. The accumulation volume or chamber is shown in FIGS. 1 through 3 as the area to the left of the tip end 11.

Further appreciation of the present invention is possible after a comparison with the prior systems, where during recovery (i.e. plasticizing), the screw was generally if not always run at its highest speed to obtain maximum shear heating and maximum throughput of plastic. However, in such conventional RS systems, it was necessary to decelerate the screw rotation to zero at a time before the accumulation of a full (i.e. complete) shot for injection purposes. This deceleration took, and therefore wasted, a finite and considerable time, and resulted in a wasting of the recovery rate because the average screw speed was lower than the nominal (highest available) screw speed setting for optimum plasticizing. Conventional thinking for the requirement for screw deceleration to zero resulted from the facts that: i) it was apparently desirable to retain the barest minimum amount of material in the screw (particularly in the context of plastic processing) after injection, which material was used for holding and packing; ii) it was apparently desirable that the residence or dwell time for plastic within the barrel be minimized; and iii) once the shot size was established, there was nowhere for additional molten material to be accumulated and that, as such, the recovery rate had to be decreased to zero.

In a complementary sense, after injection, the screw speed in the conventional prior systems had to be ramped up to achieve the optimum recovery rate, and this took time and incurred an increased energy expense required to overcome inertia forces between the screw, resin (typically in semi-solid/partially liquid form) and the inside surface of the barrel.

Of course, since heating was generally induced by the shear effect and the properties of plastic are susceptible to adverse change with overheating, the maximum screw speed was, of course, dependent upon the material being used. This consideration was particularly relevant in the processing of plastics in an injection molding environment for PET, PVC and the like. However, in prior systems where the material being processed was non-susceptible to property change with heat, maximum screw speed was desired to ensure maximum efficiency of the system and maximum throughput.

As to the underlying inventive concept, the present invention essentially defines the shot size and, in fact, controls the amount of material accumulated for the shot during the recovery phase by dynamically adjusting the back pressure. As will be understood, the back pressure is typically developed by hydraulic action and, specifically, by processor-based control of servo valves (elements 26 and 27 of FIG. 1) and hence the system control of hydraulic pressure in the injection cylinders associated with the entire injection unit. More specifically, once the desired melt volume has been accumulated or is nearly approached, the present invention causes a controlled increase in the back pressure until axial translation of the screw stops and the drag flow and back-pressure speed profiles counteract one another to produce a substantially and ideally entirely balanced flow profile.

FIG. 10 illustrates that the parabolic back-pressure speed profile increases to generate a summed flow profile 100 that has a zero (or near zero) recovery rate. It is envisaged that, rather than cause an abrupt change to a high back-pressure, it may be preferable to increase the back pressure gradually until balance is achieved at the desired accumulation volume of molten material.

In contrast with the prior systems, in the present invention, while the axial translation of the screw has been inhibited by the back-pressure, the rotation speed of the screw has been maintained. Furthermore, from a gravity feed perspective of the hopper (numeral 8 of FIG. 1), the persisting pressure and volume environment within the barrel prevent additional virgin material from entering the screw from the hopper. Hence, in the equilibrium position established at attained shot size, the control system and process have established a substantially zero recovery rate and no melt flow. Additionally, with the screw speed substantially if not entirely maintained, shear heating still continues to melt plastic granules within the upper end of the screw (upstream, i.e. behind, the check valve), which provides time savings.

Following accumulation of an appropriate volume of molten material (which may marginally exceed the volume required for complete mold filling), the back-pressure is again typically increased to force the screw forward, thereby initiating injection though the nozzle. Of course, a slight delay will occur between accumulation of the desired volume and injection, which delay results from mechanical actuation of, for example, the shut off valve 14 to allow injection into a downstream manifold or mold. With the screw continuing to rotate at operational speeds, the controller of the present invention typically supports closed loop speed control for forward axial (translational) movement of the screw towards the barrel head 14.

In general, and as will be understood, the level of back-pressure will necessarily be varied according to the viscosity of the material being plasticized.

Following injection, the system of the present invention typically moves into a hold phase where the controller administers closed loop pressure control determined, for example, by one or more of: the screw position, the expired time, the cavity pressure, or the hydraulic pressure. Hold is a conventional technique readily appreciated by those skilled in the art, and is undertaken in existing (prior art) RS injection units using known technologies. The illustrative content of FIG. 1 will, as such, be appreciated as including the necessary sensors and logic (in controller 23) to ensure that injection and hold functions can be supported.

With injection, the check valve (non-return valve) 11 essentially operates to prevent back-flow of molten material away from the nozzle 13.

The present invention also contemplates the ability to vary, dynamically, the back-pressure and speed of the screw to maintain a zero recovery rate and the balanced flow condition shown in FIG. 10. Therefore, from the commencement of injection to the end of hold, the present invention contemplates:

1. Dynamic adjustment of the back-pressure and screw speed to achieve zero or substantially zero flow across the check valve. This dynamic adjustment is preferably sensed using a pressure transducer located in the barrel and upstream of the check valve, although alternative methods appreciated by those skilled in the art may be employed, e.g. empirical determination and subsequent operational set-up based on desired results. The pressure transducer is coupled to the system controller 23, with the system controller operational to control the motor 3 and the servo valves 26 and 27 in the hydraulic supply lines 24 and 25. As will be appreciated, control of the operational speed of the screw is subject to their capacity to increase the speed. Consequently, the screw speed may need to be stepped back from its ceiling during recovery to allow its subsequent increase during injection and hold, although it will be appreciated that the stepping back of screw speed still results in higher average throughput in unit time; and/or 2. Compensation of the position of the screw to increase marginally the size of the accumulated material, in order to address expected back-flow caused by imbalanced flow profiles and non-compensatable back-pressure.

At the end of injection and hold, the screw goes into recovery whereupon the back-pressure in the first actuator is reduced and the screw begins to move backwards. The recovery rate increases in the screw, although recovery time is not now affected by having to ramp up screw speed. With the screw continuing to rotate during the entire process, the recovery rate afforded by the present invention is significantly quicker than in the prior art systems, although dwell time for the material (e.g., plastic) does increase.

In summary, the present invention dynamically varies the revolutions per minute of the screw and adjusts the back pressure to control the location of the screw and to control the recovery rate.

As will be understood, the ratio of the shot size to the screw's diameter (termed the shot utilization) is proportional to the repeatability (e.g. delivered weight) of the injection shot and cycle. In other words, higher shot utilization provides better repeatability and increased cycle consistency. Smaller screws, by their very nature, have relatively high shot utilization compared with larger diameter screws, so it is preferable to use smaller (and hence cheaper) screws. However, in the past, the fact that screws with smaller bores/diameters had an inferior recovery rate to larger diameter screws had affected their selection. Consequently, customers were previously often forced to use larger screws to meet cycle time and output requirements. By employing the concepts of the present invention, either in a new machine or through the upgrading of control software (and, where necessary, the installation of control sensors), the present invention now allows the use of smaller screws to achieve higher throughputs, i.e., higher recovery rates and more efficient and cost effective operation.

4. Advantages

According to the apparatus and methods of the present invention, improved resin mixing and melting of the unmelts is achieved. In the case of resins containing fillers or reinforcements such as long glass fibers, a more homogenous distribution of the filler or fiber throughout the melt is achieved. Because the screw can be operated at a lower speed when it turns continuously, there is less breakage of the fibers as they are processed with the melt, which results in a stronger, higher quality molded product.

Melt degradation is also reduced in the case of heat sensitive resins. This results, for example, in less generation of acetaldehyde (AA) when processing PET. The same AA generation performance may be obtained using the continuously plasticating RS injection unit of the present invention as was previously obtained using more expensive two stage injection units.

Figure 5:
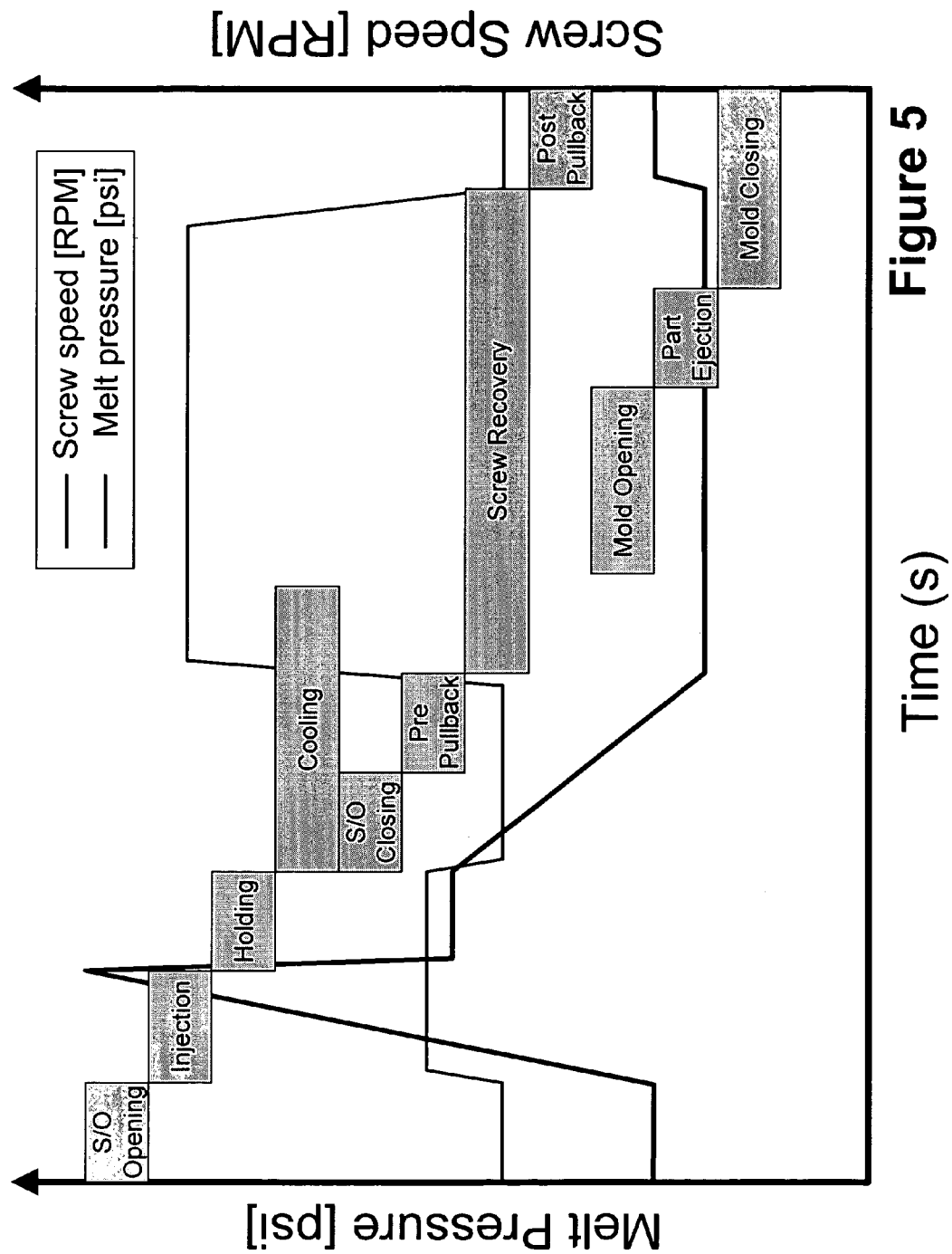
FIG. 5 is a sequence chart for a Continuous Recovery cycle according to the present invention.

In addition, the use of the methods and apparatus described herein result in a lower cost per melt throughput (measured in $/Kg/hr) and lower energy consumption per melt throughput being achieved (measured in Kw/Kg/hr). FIG. 5 shows a sequence of operation chart for an RS type injection unit of the preferred embodiment operating in a continuous recovery mode. Each step of the injection molding process is noted in its correct sequence by the text boxes starting with "S/O Opening" and finishing with "Mold Closing." In addition, graphed lines are shown representing the relative rotational speed of the screw and the relative melt pressure that rise and fall at respective times during the molding sequence. (In this context "S/O" means "shut off" and pertains to valve 16 in the nozzle for controlling the resin flow into the mold.)

Referring to FIG. 5, the solid blue graphical line represents melt pressure and corresponds to the left vertical axis (labeled Melt Pressure (psi)). The melt pressure varies during the molding cycle, the timing of which is indicated by the horizontal axis (labeled Time (s)). Reading the melt pressure from left to right the melt pressure begins at a low value and then rapidly rises to a peak at end of injection, then drops and is held at a moderate pressure during the hold stage, and then falls during cooling to an ambient value before the mold is opened and the part is ejected. The melt pressure then begins building during the end of the mold closing period.

Figure 4:
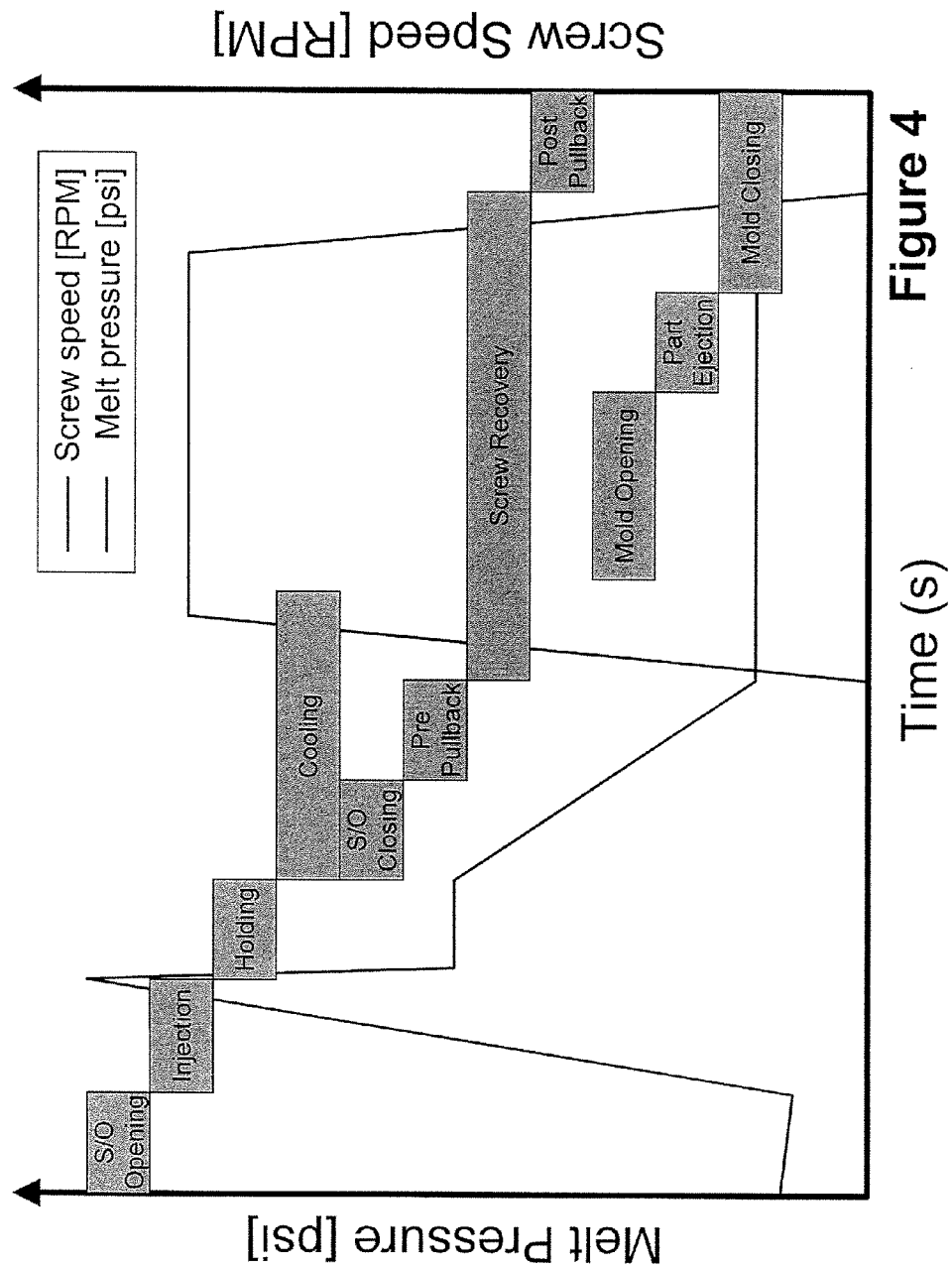
FIG. 4 is a sequence chart for a Conventional RS unit or Non-Continuous Recovery cycle.

The solid red graphical line in FIG. 5 represents screw speed and corresponds to the right vertical axis [labeled Screw Speed (rpm)]. The screw speed varies during the molding cycle. Reading the screw speed from left to right, the screw speed begins at a moderate level during shut off valve opening, increases to a slightly higher value during injection and hold, then reduces to a slightly lower value during the initial part of cooling, then increases to a substantially higher value during the latter part of cooling and for the remainder of the cycle until the latter part of mold closing when the screw speed drops to its former moderate level. Note that the operations of shut off valve closing and pre-pullback of the screw occur simultaneously with part of the mold cooling portion of the cycle, and that screw recovery occurs simultaneously with part of the mold cooling portion of the cycle, mold opening, part ejection and part of mold closing. Also, post-pullback of the screw occurs simultaneously with part of the mold closing portion of the cycle. As will be appreciated from a comparison of FIG. 5 with FIG. 4, the continuous recovery mode permits operation of the injection unit in a more efficient manner, as will now be explained.

Using the methods and apparatus of the present invention, a smaller screw can be driven at a lower speed by a smaller motor with consequentially less costly controls, breakers, etc. This results in significant savings in equipment costs. Also, because of the lower screw speed utilization, the unit operates more quietly than a conventional unit of equivalent melt throughput.

Conventional RS units stop and start the screw rotation during each molding cycle. This causes high peak torque requirements from the motor that in turn consume higher peak energy amounts. During portions of the molding cycle when the screw is not turning, melt mixing and plasticating are halted. Continuous screw rotation eliminates intermittent high peak torque demands from the motor and provides constant melt mixing and plasticating. Consequently, lower peak energy demands are made, resulting in an overall lower energy consumption from the unit.

Figure 6:
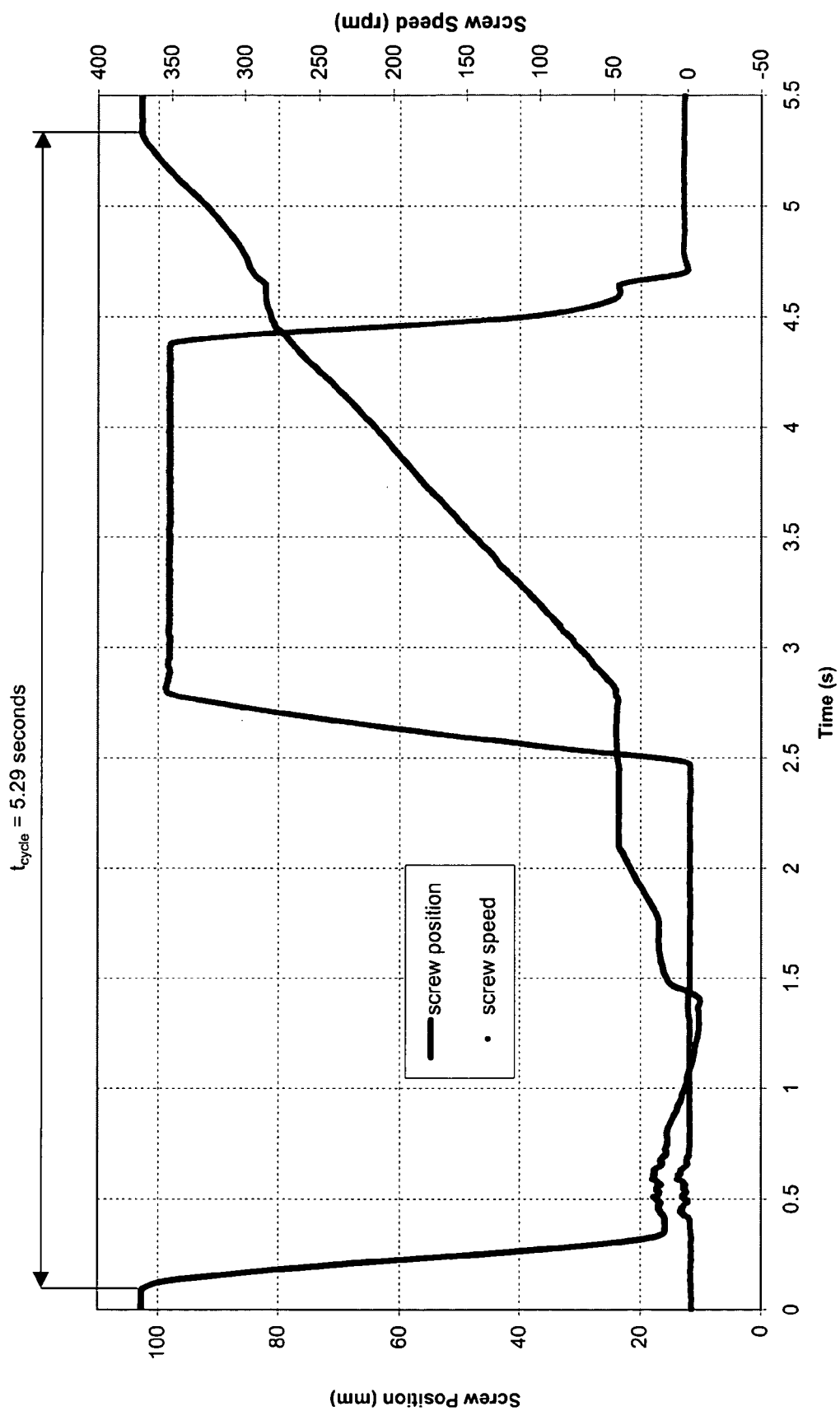
FIG. 6 is a chart showing screw speed and screw position during the Recovery cycle of FIG. 4.

FIG. 6 illustrates the prior art "re-load" time required for the screw flights to fill up during the initial rotation of the screw at the start of recovery using a non-continuous rotation approach. The screw is turning but does not translate until the flights are filled and have something to push against. Consequently, when the screw resumes rotation for plasticating, consideration must be given to venting the air trapped between the flights and the unmelted resin granules. Also, less fresh resin is available for melting within a given volume of the barrel.

Figure 7:
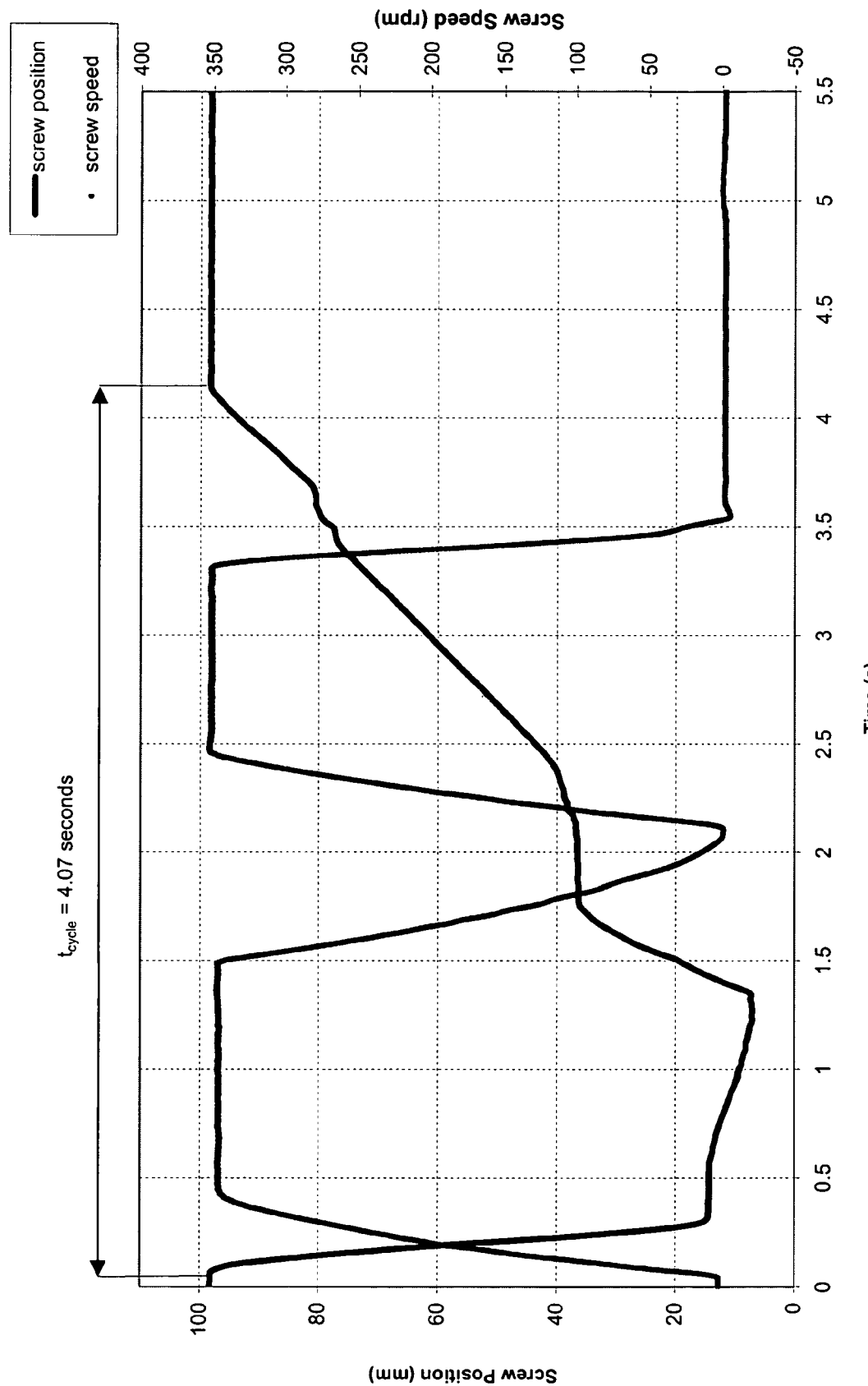
FIG. 7 is a chart showing screw speed and screw position during the Continuous Recovery cycle of FIG. 5.

With a continuously rotating screw the deficiency (shown in FIG. 6) is remedied to the extent that more resin can be ingested by the rotating screw as it passes beneath the open hopper throat during injection and hold and consequently a greater amount is available for plasticating. Also, less trapped air is present within the same volume of the barrel. FIG. 7 illustrates this by showing that the screw immediately begins translating at the start of recovery, i.e., there is no "re-load" time as indicated in FIG. 6.

All of the above advantages mean that a greater specific throughput of resin can be melted, mixed and homogenized for a given screw diameter, screw length and drive system. This increase in throughput with the use of a continuously rotating RS unit goes against established understanding which discounted this arrangement as not possible. The benefit of continuous rotation can be visualized by comparing FIGS. 6 and 7. FIG. 6 shows a molding cycle completed in 5.29 seconds, using the conventional molding cycle where the screw is rotated only during the recovery phase of the cycle. FIG. 7 shows the same molding cycle being completed in 4.07 seconds when the screw is also rotated during injection and hold.

While the preferred embodiment has been described in the context of an injection molding machine that uses an electric motor to rotate the screw and a hydraulic cylinder to translate the screw, it will be appreciated that the present invention can employ alternative, but equivalent, drive techniques to develop axial translation, screw rotation, backpressure and drag flow. Consequently, any reference to or function performed by, for example, the hydraulic cylinder should be construed in its broadest functional sense.

Furthermore, from a practical perspective, it will be understood that the check valve is best located proximate to and ideally immediately adjacent the tip of the screw since injection pressure is therefore limited to an area remote from the screw and its flights. In this configuration, the barrel's structural configuration can vary along its length and in such a way that the barrel front end supports a higher pressure environment and is more robustly constructed.

Additionally, while the preferred embodiment of the present invention generally advocates the continuous operation of the screw (even if this is at reduced rates for selected periods of time), it is perceived that the process could be substantially continuous in that there is a ramping down and immediate ramping up of the screw rotational speed in one or more of the various phases of the total injection cycle for the unit, e.g. during recovery. In contrast with the prior art [which ramps down screw rotation and then holds the screw (that is configured with a check-valve to support injection pressures) at zero rotation speed for the entire time outside of the screw recovery period (see FIG. 4)], an embodiment of the present invention could briefly cause a state of zero rotational speed to exist. Rotation of the reciprocating screw could be reduced to zero for a time of less that about 30% of total cycle time, preferably less than about 20% of the total cycle time, and most preferably less than about 15% of the total cycle time. Such a state would, however, compromise the operational efficiency of the system and hence the benefit that is derived through use of continuous screw rotation in a reciprocating screw environment in an injection unit developing injection pressures at some point within the barrel.

From a practical perspective, it would be preferable for the rotation of the screw to be near or at its maximum for greater than 50% of the total cycle and preferably as near to 100% of the time as possible. Benefit from the present invention over existing systems would nevertheless be experienced even with maximum or near maximum screw rotation during at least about 60%, preferably at least about 70%, and most preferably at least about 80% of the total cycle. Of course, any time in which the screw is not operating at maximum or near maximum rotational speeds reduces the overall plasticizing throughput (and overall recovery rate) by reducing the average screw rotation speed (and average recovery rate).

5. Conclusion

Thus, what has been described is a method and apparatus for efficiently operating an RS injection unit by utilizing continuous rotation of the screw throughout the operation of the unit, including during screw translation. To this end, a non return valve or seal is provided, along with flights resistant to resin displacement. These features improve efficiency and reduce equipment and operation costs. The concepts of the present invention (namely the continuous rotation of the screw in an RS unit) can be applied to existing systems in which the non-return valve (at the nozzle of the barrel) can be modified and that the screw's flights support continuous rotation. In order to accomplish this system modification, software control modules (such as stored and uploadable from a CD ROM or dedicated chip) can be loaded or otherwise programmed into the system controller (reference numeral 23 of FIG. 1) to modify injection unit operation and system timing. Essentially, the software program (presented typically on a computer readable medium) modifies the timing of actuation and de-actuation of servo valves associated with the RS injection unit and process control parameters determined by the sensors (as exemplified in the structure shown in FIG. 1) within the existing system.

Those skilled in the art will realize the invention is equally applicable to Thixomolding, metal injection molding, and other similar injection molding machines and methods of operating such machines having a similar general configuration and design as the RS injection unit.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. For example, while the preferred embodiment of the present invention has been described in relation to a hydraulically controlled injection unit, the present invention could also see injection pressure developed by an electric system or its functional equivalent. As such the term injection unit should be considered in a broad and functional sense." Also the present invention can find application in thixomolding and metal injection molding machines. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiments.

What is claimed is:

1. A method of operating a reciprocating feed screw of an injection unit having a non-return valve associated therewith, the non-return valve permitting the injection unit to operate at injection pressures, the method comprising:
   rotating the reciprocating screw at a speed above zero revolutions per minute over the entire injection molding cycle; and
   in a chamber downstream of a non-return valve of the feed screw, accumulating melt until a desired volume is accumulated;
   increasing back-pressure in the injection system both to establish a substantially zero recovery rate for the feed screw and to prohibit any further increase in the volume for melt accumulation.

2. A method of operating a reciprocating feed screw of an injection unit having a non-return valve associated therewith, the non-return valve permitting the injection unit to operate at injection pressures, the method comprising:
   rotating the reciprocating screw at a speed above zero revolutions per minute over the entire injection molding cycle; and
   in a chamber downstream of a non-return valve of the feed screw, accumulating melt until a desired volume is accumulated;
   increasing back-pressure in the injection system both to establish a substantially zero recovery rate for the feed screw and to prohibit any further increase in the volume for melt accumulation; and
   further increasing back-pressure within the system to produce injection of the melt from the chamber into a mold.

3. A method of operating a reciprocating feed screw of an injection unit having a non-return valve associated therewith, the non-return valve permitting the injection unit to operate at injection pressures, the method comprising:
   rotating the reciprocating screw at a speed above zero revolutions per minute over the entire injection molding cycle; and
   in a chamber downstream of a non-return valve of the feed screw, accumulating melt until a desired volume is accumulated;
   increasing back-pressure in the injection system both to establish a substantially zero recovery rate for the feed screw and to prohibit any further increase in the volume for melt accumulation;
   further increasing back-pressure within the system to produce injection of the melt from the chamber into a mold; and
   sensing at least one of a pressure environment, screw location and rotational speed of the screw; and
   controlling axial translation of the screw and selectively and dynamically varying the recovery rate of the injection unit during the injection cycle in response to corresponding ones of the pressure environment, screw location and rotational speed by adjusting at least one of:
   a) the back-pressure; and
   b) the rotational speed of the screw.

4. A method of operating a reciprocating feed screw of an injection unit having a non-return valve associated therewith, the non-return valve permitting the injection unit to operate at injection pressures, the method comprising:
   rotating the reciprocating screw at a speed above zero revolutions per minute over the entire injection molding cycle;
   in a chamber downstream of a non-return valve of the feed screw, accumulating melt until a desired volume is accumulated;
   increasing back-pressure in the injection system both to establish a substantially zero recovery rate for the feed screw and to prohibit any further increase in the volume for melt accumulation; and
   accumulating melt in the chamber until the volume of accumulated melt is equal to a sum of a shot size required for molding a part and an injection cushion volume sufficient to compensate, during injection, for potential back-flow across a non-return valve upstream of the chamber.

5. A reciprocating screw injection unit having a cyclic operating period, comprising:
   an axially translating screw mounted within a barrel, the screw having associated therewith a non-return valve downstream of which a volume of melt can, in use, be accumulated;
   a first actuator arranged to effect axial movement of the screw relative to the barrel and to generate, in use, back-pressure;
   a second actuator coupled to the screw to control, in use, rotational speed of the screw; and
   a controller for controlling operation of the screw and the first actuator, the controller arranged to set an axial position for the screw that defines the volume of melt to be accumulated downstream of the non-return valve by effecting, in use, an increase in the back-pressure to prohibit any further increase in the volume for melt accumulation and to render a recovery rate for the screw as being substantially zero and wherein the controller is arranged to ensure that the rotational speed of the screw, in use, is always above zero revolutions per minute.

6. The reciprocating screw injection unit according to claim 5, wherein the controller causes, during each injection cycle, selective variation of at least one of:
   a) the back-pressure; and
   b) the rotational speed of the screw;
   thereby to control axial translation of the screw and selectively and dynamically to vary the recovery rate of the injection unit during the injection cycle.

7. The reciprocating screw injection unit according to claim 5, further including a pressure transducer coupled to the controller.

8. The reciprocating screw injection unit according to claim 5, further including a screw position transducer coupled to the controller and responsive to the screw, the screw position transducer relaying screw position information to the controller for the purposes of at least one of:
   back-pressure control; and
   recovery rate control.

9. The reciprocating screw injection unit according to claim 5, further including a screw speed sensor coupled to the controller and the second actuator, the screw speed sensor relaying screw speed information to the controller for the purposes of dynamic recovery rate control during each injection cycle.

10. The reciprocating screw injection unit according to claim 5, wherein the screw has a tip located downstream of and proximate to the non-return valve and the barrel further has a chamber in front of the tip and into which chamber melt accumulates, the chamber having a final volume defined as a sum of a shot size and an injection cushion sufficient to compensate, during injection, for potential back-flow across the non-return valve from the chamber.

11. The reciprocating screw injection unit according to claim 10, wherein the rotational speed of the screw, in use, is constant.

12. The reciprocating screw injection unit according to claim 5, wherein, in use, the rotational speed of the screw is at a first speed during a recovery phase for the screw and, temporarily, variable towards a second speed for at least a portion of an injection phase, the second speed being lower than the first speed.

13. A controller of an injection molding machine, the controller arranged, in use, to control axial positioning of a reciprocating and continuously rotating feedscrew through selective control of back-pressure, the controller further arranged to support and control the development, in use within the injection molding machine, of back-pressure for material injection directly into one of a mold and a runner system;
   wherein the controller is arranged to maintain, in use, a substantially zero recovery rate for the screw during an injection phase, the recovery rate relating to rotational speed of the screw and back-pressure developed, in use, within an injection unit of the injection molding machine; and
   wherein the controller, in use, causes selective variation of at least one of:
   a) the back-pressure; and
   b) the rotational speed of the screw;
thereby to control axial translation of the screw and selectively and dynamically to vary, in use, the recovery rate during an operational cycle of the injection unit.

14. A controller of an injection molding machine, the controller arranged, in use, to control axial positioning of a reciprocating and continuously rotating feedscrew through selective control of back-pressure, the controller further arranged to support and control the development, in use within the injection molding machine, of back-pressure for material injection directly into one of a mold and a runner system;
   wherein the controller is arranged to maintain, in use, a substantially zero recovery rate for the screw during an injection phase, the recovery rate relating to rotational speed of the screw and back-pressure developed, in use, within an injection unit of the injection molding machine; wherein the controller is configured, in use, to decrease temporarily the rotational speed of the screw during an injection phase of the operation cycle relative to a rotational speed of the screw during a recovery phase of the operational cycle; and
   wherein the controller, in use, causes selective variation of at least one of:
   a) the back-pressure; and
   b) the rotational speed of the screw;
thereby to control axial translation of the screw and selectively and dynamically to vary, in use, the recovery rate during an operational cycle of the injection unit.

15. A controller of an injection molding machine, the controller arranged, in use, to control axial positioning of a reciprocating and continuously rotating feedscrew through selective control of back-pressure, the controller further arranged to support and control the development, in use within the injection molding machine, of back-pressure for material injection directly into one of a mold and a runner system;
   wherein the controller is arranged to maintain, in use, a substantially zero recovery rate for the screw during an injection phase, the recovery rate relating to rotational speed of the screw and back-pressure developed, in use, within an injection unit of the injection molding machine;
   wherein the controller is configured, in use, to decrease temporarily the rotational speed of the screw during an injection phase of the operation cycle relative to a rotational speed of the screw during a recovery phase of the operational cycle;
   wherein the controller is responsive, in use, to sensed pressure, location and speed signals associated with an injection unit and the controller, in use, acts substantially to maintain a zero recovery rate during an injection phase of the operation cycle; and
   wherein the controller, in use, causes selective variation of at least one of:
   a) the back-pressure; and
   b) the rotational speed of the screw;
thereby to control axial translation of the screw and selectively and dynamically to vary, in use, the recovery rate during an operational cycle of the injection unit.

16. An injection molding machine including having an injection unit base comprising:
   a barrel with an axially translating and reciprocating screw therein, the barrel having a nozzle to support, in use, injection of melt into one of a runner system and a mold, the screw having associated therewith a non-return valve downstream of which a volume of melt can, in use, be accumulated;
   a first actuator arranged to effect axial movement of the screw relative to the barrel and to generate, in use, back-pressure;
   a second actuator coupled to the screw to control, in use, rotational speed of the screw; and
   a controller for controlling operation of the screw and the first actuator, the controller arranged to set an axial position for the screw that defines the volume of melt to be accumulated downstream of the non-return valve by effecting, in use, an increase in the back-pressure to prohibit any further increase in the volume for melt accumulation and to render a recovery rate for the screw as being substantially zero and wherein the controller is arranged to ensure that, during use, the screw rotates continuously.

17. The injection molding machine according to claim 16, wherein the controller causes, during each injection cycle, selective variation of at least one of:
   a) the back-pressure; and
   b) the rotational speed of the screw;
thereby to control axial translation of the screw and selectively and dynamically to vary the recovery rate of the injection unit during the injection cycle.

18. The injection molding machine according to claim 17, further including a pressure transducer coupled to the controller.

19. The injection molding machine according to claim 17, further including a screw position transducer coupled to the controller and responsive to the screw, the screw position transducer relaying screw position information to the controller for the purposes of at least one of:
   back-pressure control; and
   recovery rate control.

20. The injection molding machine according to claim 19, further Including a screw speed sensor coupled to the controller and the second actuator, the screw speed sensor relaying screw speed information to the controller for the purposes of dynamic recovery rate control during each injection cycle.

21. The injection molding machine according to claim 16, wherein the screw has a tip located downstream of and proximate to the non-return valve and the barrel further has a chamber in front of the tip and into which chamber melt accumulates, the chamber having a final volume defined as a sum of a shot size and an injection cushion sufficient to compensate, during injection, for potential back-flow across the non-return valve from the chamber.

22. The injection molding machine according to claim 21, wherein the rotational speed of the screw, in use, is constant.

23. The injection molding machine according to claim 18, wherein, in use, the rotational speed of the screw is at a first speed during a recovery phase for the screw and, temporarily, variable towards a second speed for at least a portion of an injection phase, the second speed being lower than the first speed.

* * * * *